(12) United States Patent
Hirose

(10) Patent No.: US 7,429,911 B2
(45) Date of Patent: Sep. 30, 2008

(54) POWER SOURCE CONTROL DEVICE FOR ELECTRONIC DEVICE

(75) Inventor: Takeshi Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 10/791,273

(22) Filed: Mar. 3, 2004

(65) Prior Publication Data

US 2005/0065661 A1     Mar. 24, 2005

Related U.S. Application Data

(63) Continuation of application No. PCT/JP01/07605, filed on Sep. 3, 2001.

(51) Int. Cl.
    *G05F 1/00*     (2006.01)
(52) U.S. Cl. .................. 340/5.54; 340/5.1; 340/5.7; 340/5.73; 700/286
(58) Field of Classification Search .............. 340/5.1, 340/5.7, 5.73, 825, 5.54; 700/286
    See application file for complete search history.

(56) References Cited

U.S. PATENT DOCUMENTS

| 4,860,002 | A | * | 8/1989 | Imaizumi et al. | 340/5.64 |
| 5,596,234 | A | * | 1/1997 | Umeda et al. | 307/10.2 |
| 6,164,403 | A | * | 12/2000 | Wuidart | 180/287 |
| 6,420,971 | B1 | * | 7/2002 | Leck et al. | 340/542 |
| 6,545,587 | B1 | | 4/2003 | Hatekayama | |

FOREIGN PATENT DOCUMENTS

| JP | 04-348408 | 12/1992 |
| JP | 10-155722 | 6/1998 |
| JP | 2989795 | 2/1999 |
| JP | 11-272418 | 10/1999 |
| JP | 2000-172960 | 6/2000 |
| JP | 2000-197166 | 7/2000 |
| JP | 2000-276247 | 10/2000 |
| JP | 2000-350268 | 12/2000 |
| JP | 2001-142557 | 5/2001 |

OTHER PUBLICATIONS

Notification of Transmittal of Copies of Translation of the International Preliminary Examination Report mailed May 13, 2004 from the PCT International Bureau in connection with corresponding International Patent Application.

* cited by examiner

*Primary Examiner*—Brian Zimmerman
*Assistant Examiner*—Yong Hang Jiang
(74) *Attorney, Agent, or Firm*—Staas & Halsey LLP

(57) ABSTRACT

A power source control device for an electronic device, comprising: a storage unit storing condition information about conditions for supplying electric power to an electronic device; a receiving unit receiving, via a communication path from a power source remote control device of said electronic device, condition judging information for judging whether a power supply command to said electronic device and the conditions are met or not; a judging unit judging whether the conditions are met or not by use of the condition judging information received by said receiving unit and the condition information stored on the storage unit; and a supply unit controlling, in a case where said judging unit judges that the conditions are met, a power source of said electronic device so that said electronic device is supplied with the electric power.

20 Claims, 14 Drawing Sheets

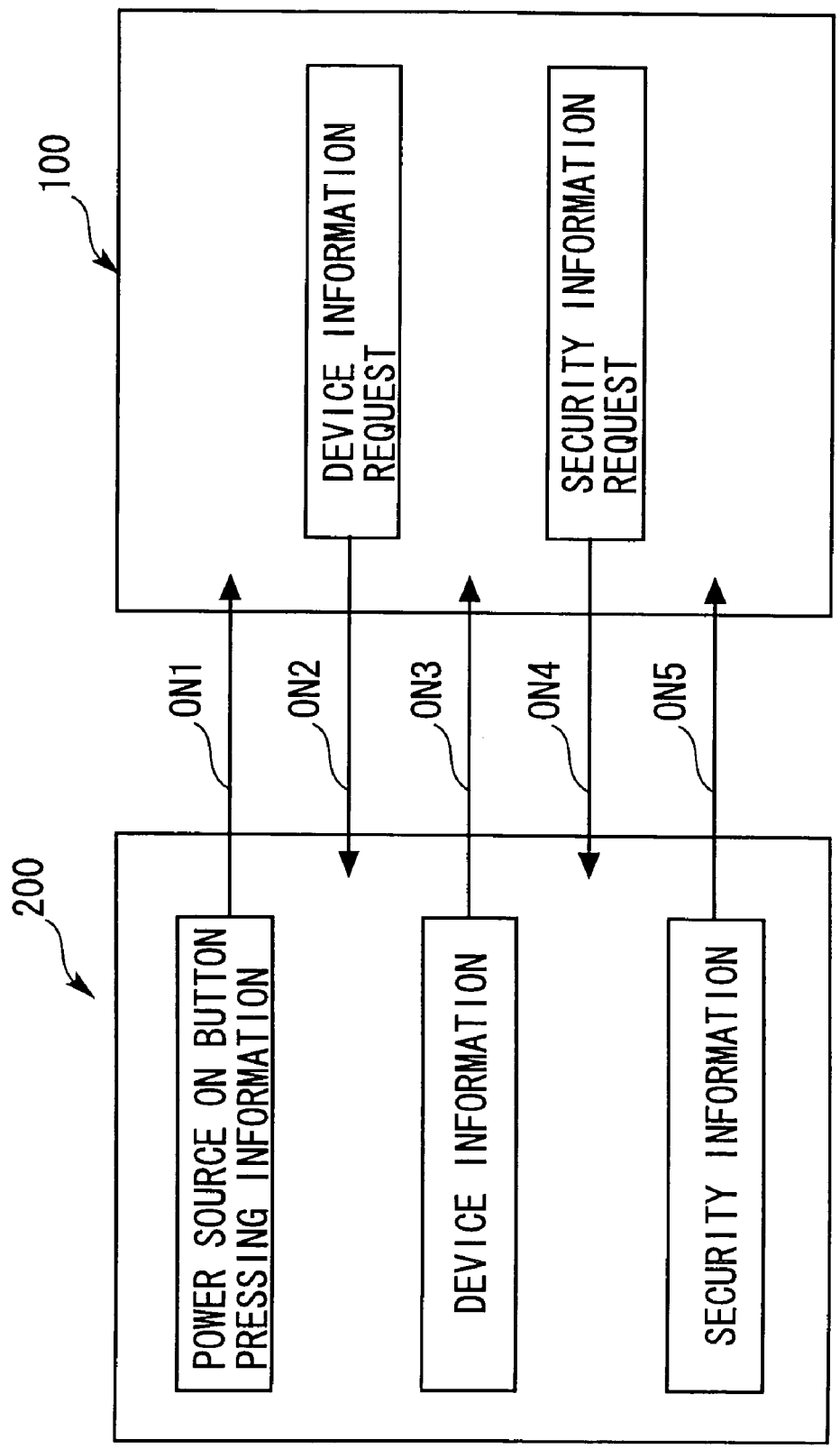

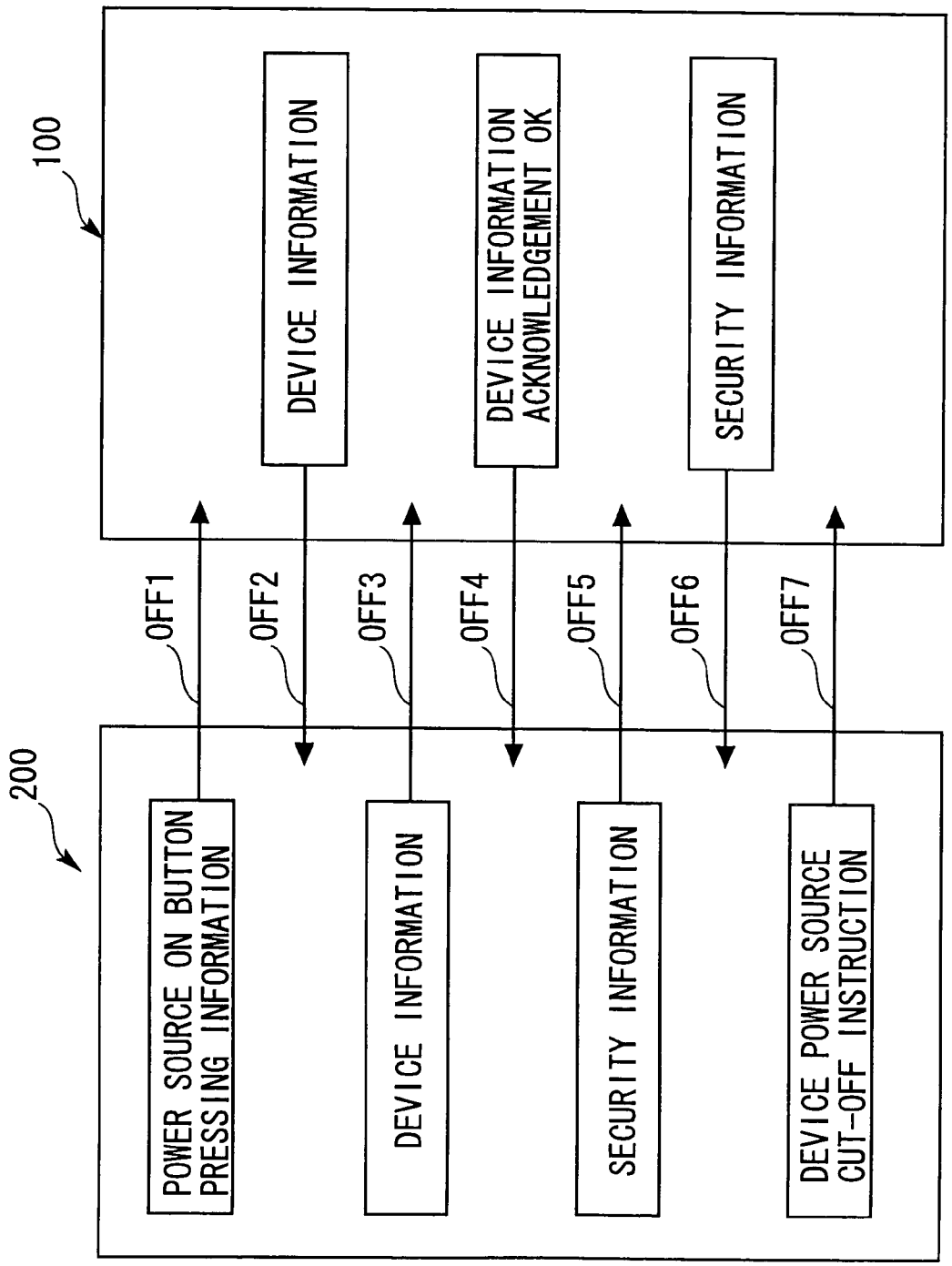

POWER SOURCE CONTROL DEVICE FOR ELECTRONIC DEVICE

This application is a continuing application, filed under 35 U.S.C. §111(a), of International Application PCT/JP01/07605, filed Sep. 3, 2001.

BACKGROUND OF THE INVENTION

The present invention relates to a power source control device for holding confidentiality of information stored on an electronic device by controlling a supply of electronic power to the electronic device.

There have hitherto been a variety of systems for preventing an electronic device from being operated by a party other than persons concerned in order to hold confidentiality of confidential information such as individual information retained on a device (an electronic device) like an information terminal and inside information of an enterprise, which should not be leaked outside.

Among the systems that restrict users of the electronic device, there is, for example, a system providing a password in a basic input/output system (BIOS) installed into the information terminal. In this system, the BIOS is booted after the information terminals has been supplied with electric power, and the user is requested to input the password during the booting of the BIOS. The information terminal does not come to a standby status (where an operating system (OS) is booted) till a correct password is inputted by the user. The information terminal comes to the standby status and is thereby capable of being operated. It is therefore impossible in this system to enable the information terminal to be in the standby status unless the user input correct password. Hence, the persons concerned retain the password confidentially, whereby the information terminal can be prevented from being operated by a party other than the persons concerned.

The system providing the password in the BIOS described above is, however, incapable of ensuring a sufficient number of digits of the password. Further, there a possibility in which the user might select an inadequate password (a password that can be easily deduced by the party other than the persons concerned, such as initials, a date of birth, a telephone number, etc. of the user). For these reasons, there is a possibility wherein the party other than the persons concerned might easily discover the password.

Moreover, the system described above invariably prepares a cancellation method (such as a method of setting the electronic device in a standby status even if the password is not inputted, a method of setting a password afresh, and so on) generally in consideration of such a case that the user might forget the password. It is easy for the party other than the persons concerned to know the cancellation method, and the cancellation method has widely spread.

The information terminal, which has already been supplied with the electric power (the BIOS has already operated), has the possibility of being set in the standby status and operated by the party other than the persons concerned due to such causes that the password is thus easily known and that the cancellation unit has spread widely.

The present invention aims at providing a system capable of making it difficult for the party other than the persons concerned to set the electronic device in the standby status by supplying the electric power to the electronic device.

SUMMARY OF THE INVENTION

The present invention adopts the following architectures for attaining the above object. Namely, the present invention is a power source control device of an electronic device, comprising a storage unit storing condition information about conditions for supplying electric power to an electronic device; a receiving unit receiving, via a communication path from a power source remote control device of the electronic device, condition judging information for judging whether a power supply command to the electronic device and the conditions are met or not; a judging unit judging whether the conditions are met or not by use of the condition judging information received by the receiving unit and the condition information stored on the storage unit; and a supply unit controlling, in a case where the judging unit judges that the conditions are met, a power source of the electronic device so that the electronic device is supplied with the electric power.

According to the power source control device for the electronic device of the present invention, the receiving unit receives the power supply command and the condition judging information from the power source remote control device of the electronic device. The judging unit judges whether or not the received condition judging information meets the conditions of the condition information stored on the condition information storage unit. In a case where the judging unit that the conditions are met, the supply unit controls the power source of the electronic device so that the electronic device is supplied with the electronic power. Therefore, the supply of the electric power to the electronic device requires the power source remote control device for transmitting, to the power source control device, two pieces of information such as the condition judging information and the power supply command that meet the condition of the condition information retained on the storage unit of the power source control device. Hence, it is difficult for the party other than the persons concerned that does not have the power source remote control device to supply the electronic device with the electric power.

Further, the power source control device for the electronic device according to the present invention may further comprise a notifying unit notifying, in a case where the receiving unit receives a stop command of a supply of the electric power to the electronic device from the power source remote control device, the power source remote control device of the condition judging information associated with the condition information stored on the storage unit, a check-and-judge unit judging, in a case where the receiving unit receives from the power source remote control device the condition judging information which the notifying unit has notified of, whether the conditions are met or not by use of the condition judging information and the condition information stored on the storage unit, and a stopping unit controlling, in a case where the check-and-judge unit judges that the conditions are met, the power source of the electronic device so as to stop the supply of the electric power to the electronic device.

According to the power source control device for the electronic device of the present invention, when the receiving unit receives the stop command from the power source remote control device of the electronic device, the notifying unit reads the condition information from the condition information storage unit, and notifies the power source remote control device of the electronic device, of the condition judging information associated with the readout condition information. Thereafter, with a receipt of the condition judging information of which the notifying unit has notified from the power source remote control device of the electronic device, the check-and-judge unit judges whether the conditions are met or not by use of the received condition judging information and the condition information stored on the storage unit. After the check-and-judge unit has judged that the conditions are met, the stopping unit stops the supply of the electric power to the electronic device.

Moreover, in the power source control device for the electronic device of the present invention, the storage unit may store collation source information as the condition information, the receiving unit may receive collation object information as the condition judging information from the power source remote control device, and the judging unit, in a case where the collation source information is coincident with the collation object information, may judge that the conditions are met.

Further, in the power source control device for the electronic device of the present invention, wherein the collation source information may contain identifying information of the electronic device.

Still further, in the power source control device for the electronic device of the present invention, the identifying information of the electronic device may contain an end time of the electronic device.

Yet further, in the power source control device for the electronic device of the present invention, the collation source information may contain authenticating information of a user of the electronic device.

Moreover, in the power source control device for the electronic device of the present invention, the authenticating information of the user may contain a password designated by the user.

Furthermore, in the power source control device for the electronic device of the present invention, the authenticating information of the user may contain biometrics information of the user. The biometrics information of the user contains, for example, fingerprint information, iris information, retina information and so forth.

Further, in the power source control device for the electronic device of the present invention, the collation source information may contain electronic device identifying information generated by the electronic device or by the power source control device and of which the power source remote control device is notified as the collation object information, and may contain user authenticating information received from the power source remote control device and used also as the collation object information.

Moreover, the present invention is a power source control system of an electronic device, comprising a power source control device including: a condition information storage unit storing condition information about conditions for supplying electric power to an electronic device; a receiving unit receiving, in the case of obtaining a power supply command to the electronic device, condition judging information for judging whether the conditions are met or not via a communication path from a power source remote control device of the electronic device; a judging unit judging whether the conditions are met or not by use of the condition judging information received by the receiving unit and the condition information stored on the condition information storage unit; and a supply unit giving, in a case where the judging unit judges that the conditions are met, an instruction of supplying the electric power to the electronic device; and a power source remote control device including: a condition judging information storage unit storing the condition judging information; an input unit; and a transmitting unit transmitting, in a case where a power supply command to the electronic device is inputted from the input unit, the power supply command and the condition judging information stored on the condition judging information storage unit to the power source control device via the communication path.

According to the power source control system for the electronic device of the present invention, the transmitting unit transmits, to the power source control device of the electronic device, the condition judging information stored on the condition judging information storage unit and the power supply command inputted by the input unit. When the receiving unit of the power source control device receives the power supply command and the condition judging information, the judging unit judges whether the conditions are met (such as being coincident or being transformed based on a predetermined rule, etc.) or not by use of the received condition judging information and the condition information stored on the condition information storage unit. Only in a case where the judging unit judges that the conditions are met, the supply unit controls the power source to supply the electronic device with the electric power, and the electronic device is supplied with the electronic power and comes to a standby status.

Further, in the power source control system of the electronic device of the present invention, the power source control device may further include a notifying unit notifying, in a case where the receiving unit receives a stop command of a supply of the electric power to the electronic device from the power source remote control device, the power source remote control device of the condition judging information associated with the condition information stored on the condition information storage unit, a check-and-judge unit judging, in a case where the receiving unit received from the power source remote control device the condition judging information which the notifying unit has notified of, whether the conditions are met or not by use of the condition judging information and the condition information stored on the storage unit, and a stopping unit stopping, in a case where the check-and-judge unit judges that the conditions are met, the supply of the electric power to the electronic device, and the power source remote control device, in the case of receiving the condition judging information from the notifying information, may store the condition judging information storage unit with the condition judging information, and may transmit the condition judging information to the power source control device for processing by the check-and-judge unit.

According to the power source control system of the electronic device of the present invention, after the power source control device has received the stop command from the power source remote control device, the notifying unit of the power source control device notifies the power source remote control device of the condition judging information associated with the condition information stored on the condition information storage unit. The power source remote control device, upon receiving the condition judging information, writes the received condition judging information to the condition judging information storage unit, and transmits the written condition judging information to the power source control device. When the power source control device received the condition judging information from the power source remote control device, the check-and-judge unit judges whether the conditions are met or not by use of the received condition judging information and the condition information stored on the condition information storage unit. In a case where the check-and-judge unit judges that the conditions are met, the stopping unit stops the supply of the electric power to the electronic device.

Further, in the power source control system of the electronic device of the present invention, the storage unit may store collation source information as the condition information, the receiving unit may receive collation object information as the condition judging information from the power source remote control device, and the judging unit, in a case where the collation source information is coincident with the collation object information, may judge that the conditions are met.

Moreover, in the power source control system of the electronic device of the present invention, the collation source information may contain identifying information of the electronic device.

Further, in the power source control system of the electronic device of the present invention, the identifying information of the electronic device may contain an end time of the electronic device.

Still further, the collation source information may contain authenticating information of a user of the electronic device.

Yet further, in the power source control system of the electronic device of the present invention, the authenticating information of the user may contain a password designated by the user.

Furthermore, in the power source control system of the electronic device of the present invention, the authenticating information of the user may contain biometrics information of the user.

Still furthermore, in the power source control system of the electronic device of the present invention, the collation source information may contain electronic device identifying information generated by the electronic device or by the power source control device and given as the collation object information to the power source remote control device, and may contain user authenticating information received from the power source remote control device and used also as the collation object information.

Yet furthermore, in the power source control system of the electronic device of the present invention, the power source remote control device may further include a regulation unit regulating an operation of transmitting the power supply command to the power source control device by the transmitting unit and/or an operation of inputting the power supply command and a stop command by the input unit, a cancellation condition information storage unit stored with cancellation condition information about conditions for canceling the regulation, a cancellation condition judging unit judging, in a case where there is inputted cancellation condition judging information for judging whether the cancellation conditions are met or not, whether the cancellation conditions are met or not by use of the cancellation condition information stored on the cancellation condition information storage unit and the inputted cancellation condition judging information, and a canceling unit canceling the regulation in a case where the cancellation condition judging unit judges that the cancellation conditions are met.

According to the power source control system of the electronic device of the present invention, the regulation unit previously regulates the operation of the transmitting unit of the power source remote control device and/or the operation of inputting the power supply command and the stop command by the input unit, whereby the power supply command can not be transmitted to the power source control device. When the input unit input the cancellation condition judging information, the cancellation condition judging unit judges whether the cancellation conditions are met or not by use of the inputted cancellation condition judging information and the cancellation condition information stored on the cancellation condition information storage unit. In a case where the cancellation condition judging unit judges that the cancellation conditions are met, the canceling unit cancels the regulations.

Further, in the power source control system of the electronic device of the present invention, the power source remote control device may have a portable box body provided with the condition judging information storage unit, the input unit and the transmitting unit, and the transmitting unit may transmit the power supply command and the condition judging information to the power source control device in a non-contact communication.

BRIEF DESCRIPTION OF THE DRAWINGS

FIG. 13 is a diagram showing a data flow when switching ON a power source in a power source control system of the electronic device shown in FIG. 1; and FIG. 14 is a diagram showing a data flow when switching OFF the power source in the power source control system of the electronic device shown in FIG. 1.

DETAILED DESCRIPTION OF THE PREFERRED EMBODIMENTS

An embodiment of the present invention will hereinafter be described with reference to the drawings. An architecture of the embodiment is an exemplification, and the present invention is not limited to the architecture of the embodiment.

<System Architecture>

Figure 1:
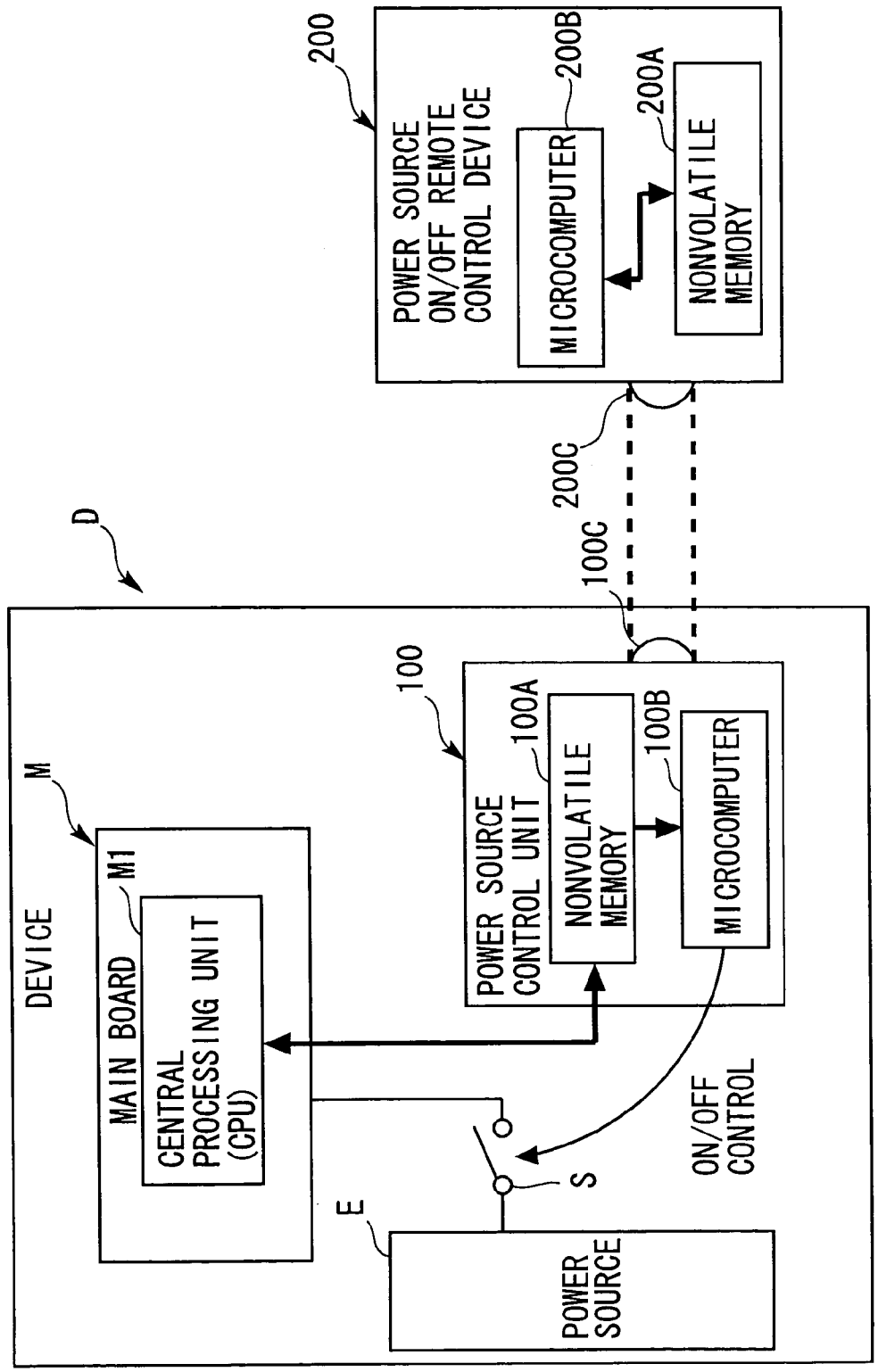
FIG. 1 is a diagram showing a hardware architecture in an embodiment of a power source control system of an electronic device according to the invention.

FIG. 1 is a diagram showing an outline of a hardware architecture of a power source control system of an electronic device according to the embodiment of the invention. This system is employed for controlling a supply of electric power to a device D (corresponding to an electronic device of the present invention) by use of a device separated from the device D. As illustrated in FIG. 1, the device D includes: a power source control device 100 (corresponding to a power source control device for the electronic device of the present invention) having a nonvolatile memory 100A, a microcomputer 100B and a communication device 100C, the device 100 controlling a power source of the device D; a main board M having a central processing unit (CPU) M1; a power source E; and a switch S provided between the power source E and the main board M. A power source ON/OFF remote control device 200 (corresponding to a power source remote control device for the electronic device of the present invention) includes a nonvolatile memory 200A, a microcomputer 200B and a communication device 200C. The main board M and the power source control device 100 are supplied with the electric power from the power source E respectively via different paths and thus operate, and the power source control device 100 is constructed to operate even in a state where the electric power is not supplied to the main board M.

Figure 2:
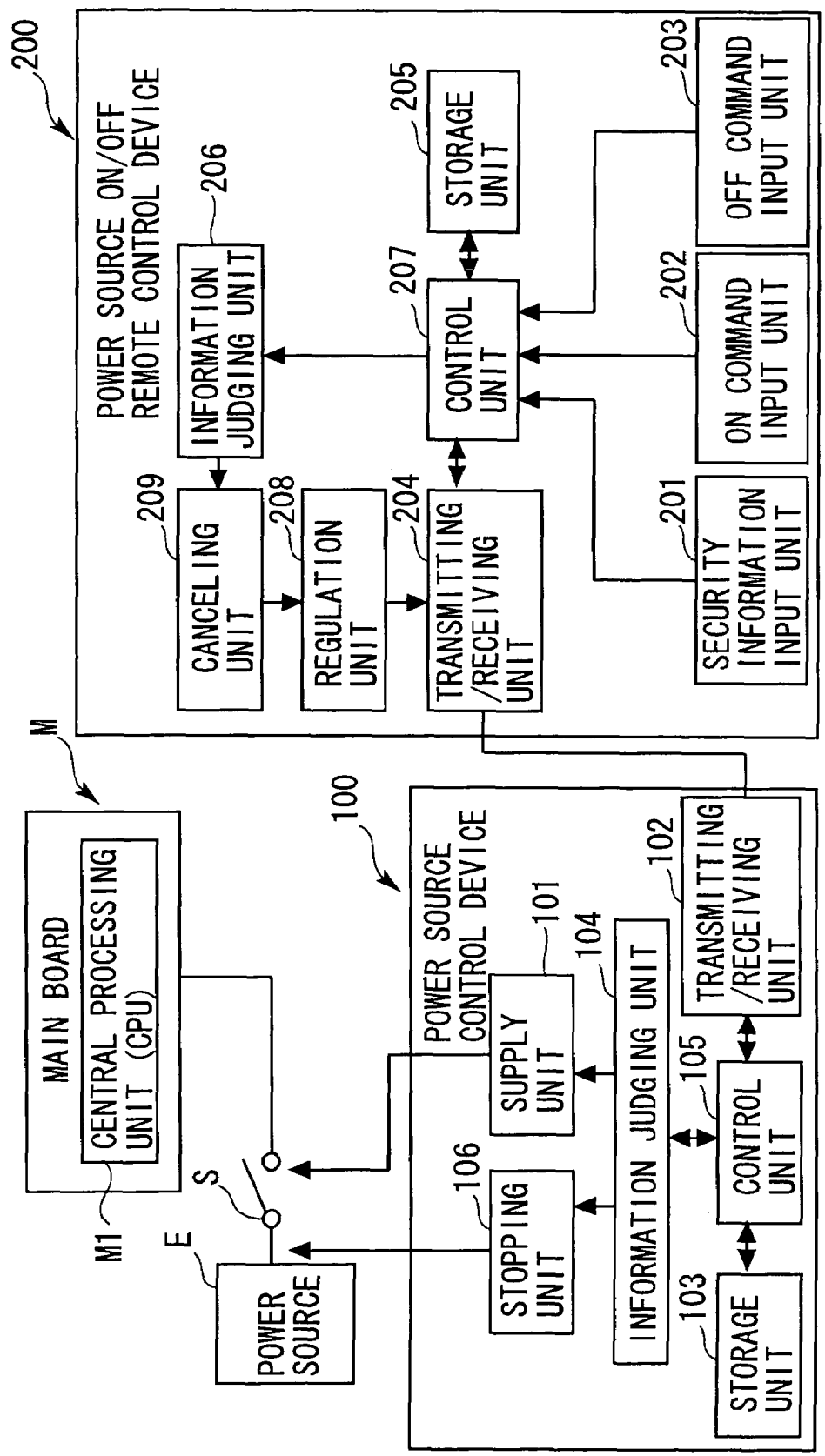
FIG. 2 is a diagram showing system blocks of the power source control system of the electronic device shown in FIG. 1.

FIG. 2 is a diagram showing system blocks of the power source control system in the embodiment of the present invention. Respective components included in the present system will be described in detail with reference to FIG. 2.

<<Power Source Control Device 100>>

The power source control device 100 is a device for controlling the power supply (ON/OFF) of the device D, and is constructed of a supply unit 101 (corresponding to a supply unit of the present invention), a transmitting/receiving unit 102 (corresponding to a receiving unit and a notifying unit of the present invention), a storage unit 103 (corresponding to a storage unit and a condition information storage unit of the present invention), an information judging unit 104 (corresponding to a judging unit and a check-and-judge unit of the present invention), a control unit 105, a stopping unit 106 (corresponding to a stopping unit of the present invention) and an unillustrated timer unit.

Note that the supply unit 101, the information judging unit 104, the control unit 105 and the stopping unit 106 shown in FIG. 2 correspond to the microcomputer 100B in FIG. 1, the transmitting/receiving unit 102 corresponds to the communication device 100C in FIG. 1, and the storage unit 103 corresponds to the nonvolatile memory 100A in FIG. 1, respectively.

The supply unit 101 controls ON/OFF of the power source of the device D. In the case of receiving a power supply request to the device D from the information judging unit 104, the supply unit 101 supplies the electric power to the device D.

The transmitting/receiving unit 102 transfers and receives the information to and from the power source ON/OFF remote control device 200. The transmitting/receiving unit 102 may be so constructed as to be wired as by USB (Universal Serial Bus) and also be wireless (non-contact communication) as by IrDA (Infrared Data Association).

The storage unit 103 is constructed of a flash ROM. The storage unit 103 is stored with pieces of device information (corresponding to condition information, collating source information, electronic device identifying information and an end time of the electronic device according to the present invention), and security information (corresponding to condition information, collating source information, user authentication information, a password designated by a user, and biometrics information of the user according to the present invention). The storage unit 103, from which and to which the control unit 105 executes reading and writing the data, is capable of semi-permanently storing the data even when receiving no power supply.

The information judging unit 104 judges whether the electric power is supplied to the device D or not. The information judging unit 104 judges whether or not the device information or the security information stored on the storage unit 103 is not contradictory (is coincident with or becomes coincident by converting one and/or the other, and so on) to the device information (corresponding to condition judging information and collation object information according to the present invention) or the security information (corresponding to condition judging information and collation object information according to the present invention) received by the transmitting/receiving unit 102 from the power source ON/OFF remote control device 200. The information judging unit 104 sends a power supply request to the supply unit 101 in a case where the information judging unit 104 judges that the device information and the security information have no contradiction.

The control unit 105 is constructed of a CPU, a controller of peripheral devices thereto, etc., and controls the reading/writing of the data from and to the storage unit 103.

The stopping unit 106 controls ON/OFF of the power source of the device D. In the case of receiving a power supply stop request to the device D from the information judging unit 104, the stopping unit 106 stops the power supply to the device D.

The timer unit measures a predetermined period of time by utilizing, for instance, an operation clock of the CPU. The timer unit transmits a timeout signal when a predetermined time elapses since the transmitting/receiving unit 102 of the power source control device 100 has stared transmitting and receiving.

<<Power Source ON/OFF Remote Control Device 200>>

The power source ON/OFF remote control device 200 is a device for transmitting an ON command (a power supply command) and an OFF command (a stop command) to the power source control device 100 so as to supply (and to stop the supply of) the electric power to the device D. The power source ON/OFF remote control device 200 is constructed of a security information input unit 201, an ON command input unit 202, an OFF command input unit 203, a transmitting/receiving unit 204 (corresponding to a transmitting unit according to the present invention), a storage unit 205 (corresponding to a condition judging information storage unit and a cancellation condition information storage unit according to the present invention), an information judging unit 206 (corresponding to a cancellation condition judging unit according to the present invention), a control unit 207, a regulation unit 208 (corresponding to a regulation unit according to the present invention), a canceling unit 209 (corresponding to canceling unit according to the present invention), and an unillustrated timer unit.

Note that the information judging unit 206, the control unit 207, the regulation unit 208 and the canceling unit 209 shown in FIG. 2 correspond to the microcomputer 200B in FIG. 1, the transmitting/receiving unit 204 in FIG. 2 corresponds to the communication device 200C in FIG. 1, and the storage unit 205 in FIG. 2 corresponds to the nonvolatile memory 200A in FIG. 1, respectively.

The security information input unit 201 is constructed by use of buttons, a keyboard, a pointing device (such as a mouse, a trackball, a joystick, etc.) or a scanner, etc. and is used for a user to input the security information (corresponding to the condition judging information, the collation object information and canceling condition judging information according to the present invention).

The ON command input unit 202 and the OFF command input unit 203 are constructed by use of buttons and are used for the user to input the ON command and the OFF command, respectively.

The transmitting/receiving unit 204 transfers and receives the information to and from the power source control device 100. The transmitting/receiving unit 204 may be so constructed as to be wired as by the USB and also to be wireless as by the IrDA.

The storage unit 205 is constructed of a flash ROM. The storage unit 205 is stored with the device information and the security information. The storage unit 205, from which and to which the control unit 207 executes reading and writing the data, is capable of semi-permanently storing the data even when supplied with no electric power.

The information judging unit 206 judges whether a regulation effected by the regulation unit 208 is canceled or not. The information judging unit 206 judges whether or not the security information stored on the storage unit 205 is contradictory to the security information inputted through the security information input unit 201. The information judging unit 206, in the case of judging that two pieces of security information are not contradictory to each other, sends a regulation canceling request to the canceling unit 209.

The control unit 207 is constructed of a CPU, a controller of peripheral devices thereto, etc., and controls the reading/writing of the data from and to the storage unit 205.

The regulation unit 208 regulates operations on the ON command input unit 202 and the OFF command input unit 203.

The canceling unit 209 cancels the regulation described above. The canceling unit 209, in the case of receiving the regulation canceling request for canceling the regulation from the information judging unit 206, cancels the above regulation effected by the regulation unit 208, thereby enabling the operations of the ON command input unit 202 and of the OFF command input unit 203.

The timer unit measures a predetermined period of time by utilizing, for example, an operation clock of the CPU. The timer unit transmits a timeout signal when a predetermined time elapses since the transmitting/receiving unit 204 of the power source ON/OFF remote control device 200 has stared transmitting and receiving.

It is to be noted that the security information input unit 201, the ON command input unit 202 and the OFF command input unit 203 correspond to an input unit according to the present invention.

Figure 3:
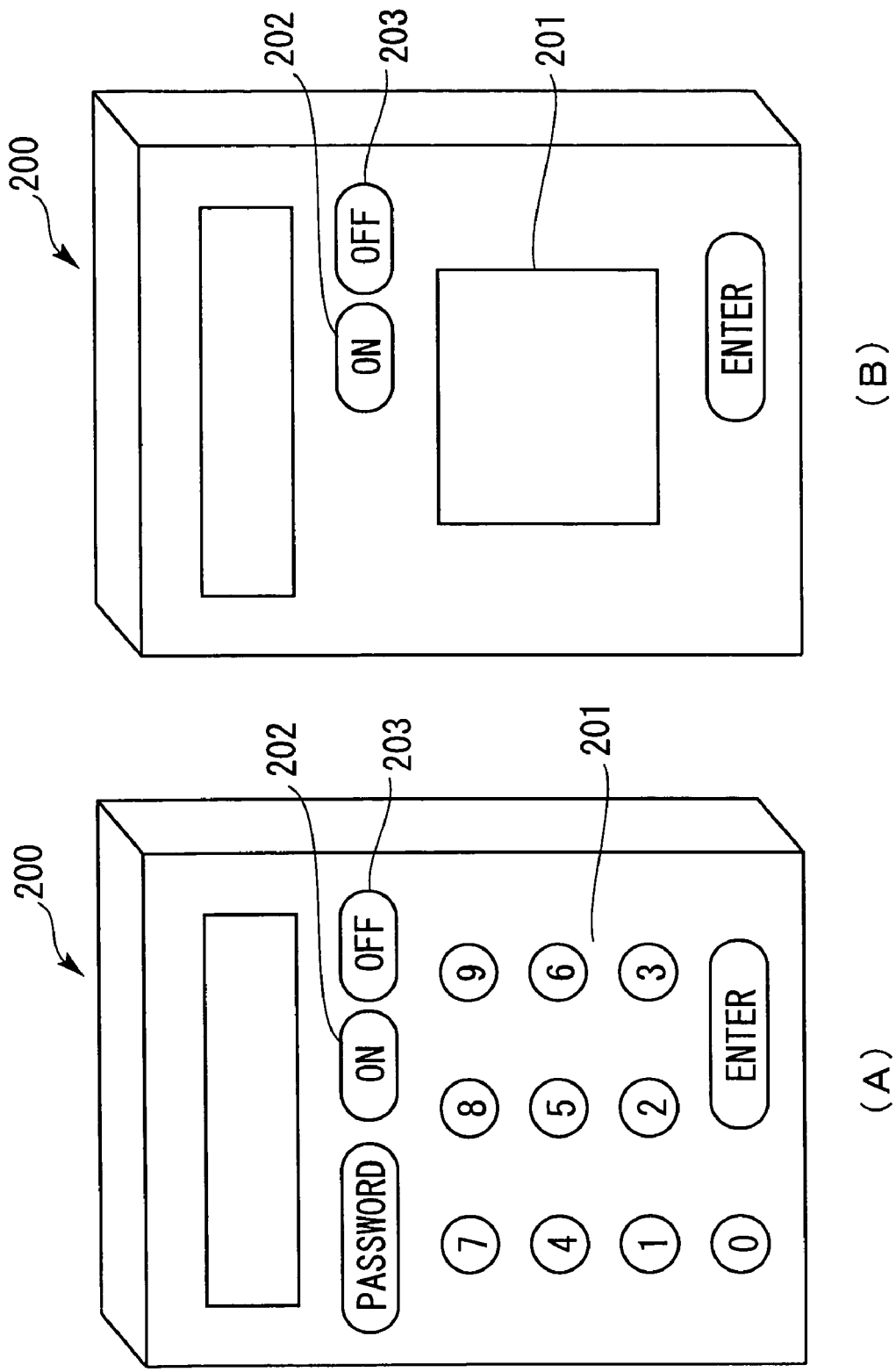
FIG. 3 illustrates an example of an external configuration of a power source ON/OFF remote control device shown in FIG. 1.

FIG. 3 illustrates an example of an external configuration of the power source ON/OFF remote control device 200 in this embodiment. As shown in FIG. 3, the power source ON/OFF remote control device 200 is constructed of a rectangular parallelepiped (a box body having portability) of which thickness is comparatively small, wherein a surface having the largest area is provided with the output unit, the ON command input unit 202, the OFF command input unit 203 and the security information input unit 201. Further, a surface having the smallest area is provided with the transmitting/receiving unit 204.

FIG. 3(A) shows an example in which the security information input unit 201 is constructed of buttons. It is preferable that this architecture be taken in a case where, for instance, the security information is a password structured of numerals. Further, in FIG. 3(B), the security information input unit 201 is constructed of a scanner. It is preferable that this architecture be taken in a case where, for example, the security information is structured of fingerprint information of the user.

The security information may also be biometrics information typified by the fingerprint described above. Therefore, the security information input unit 201 may also be constructed of an input unit inputting the biometrics information adopted.

<Examples of Operations of Present System>

FIGS. 4 through 12 are flowcharts showing examples of operations of the present system. Next, the examples of the operations of the present system will be described with reference to FIGS. 4 through 12.

<<Example of Operation of Power Source Control Device 100>>

Figure 4:
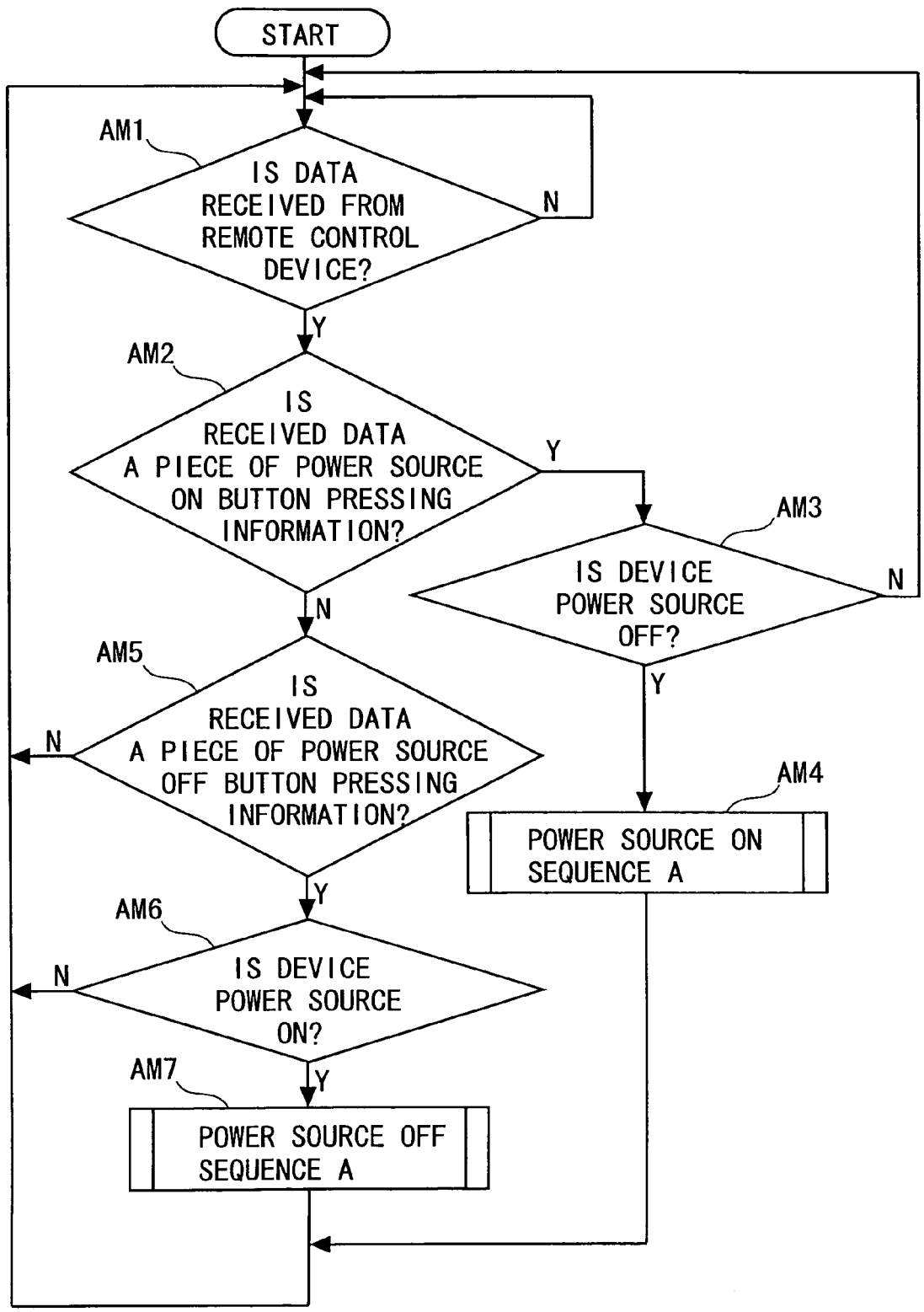
FIG. 4 is a flowchart showing an example of an operation of a power source control unit shown in FIG. 1.
Figure 5:
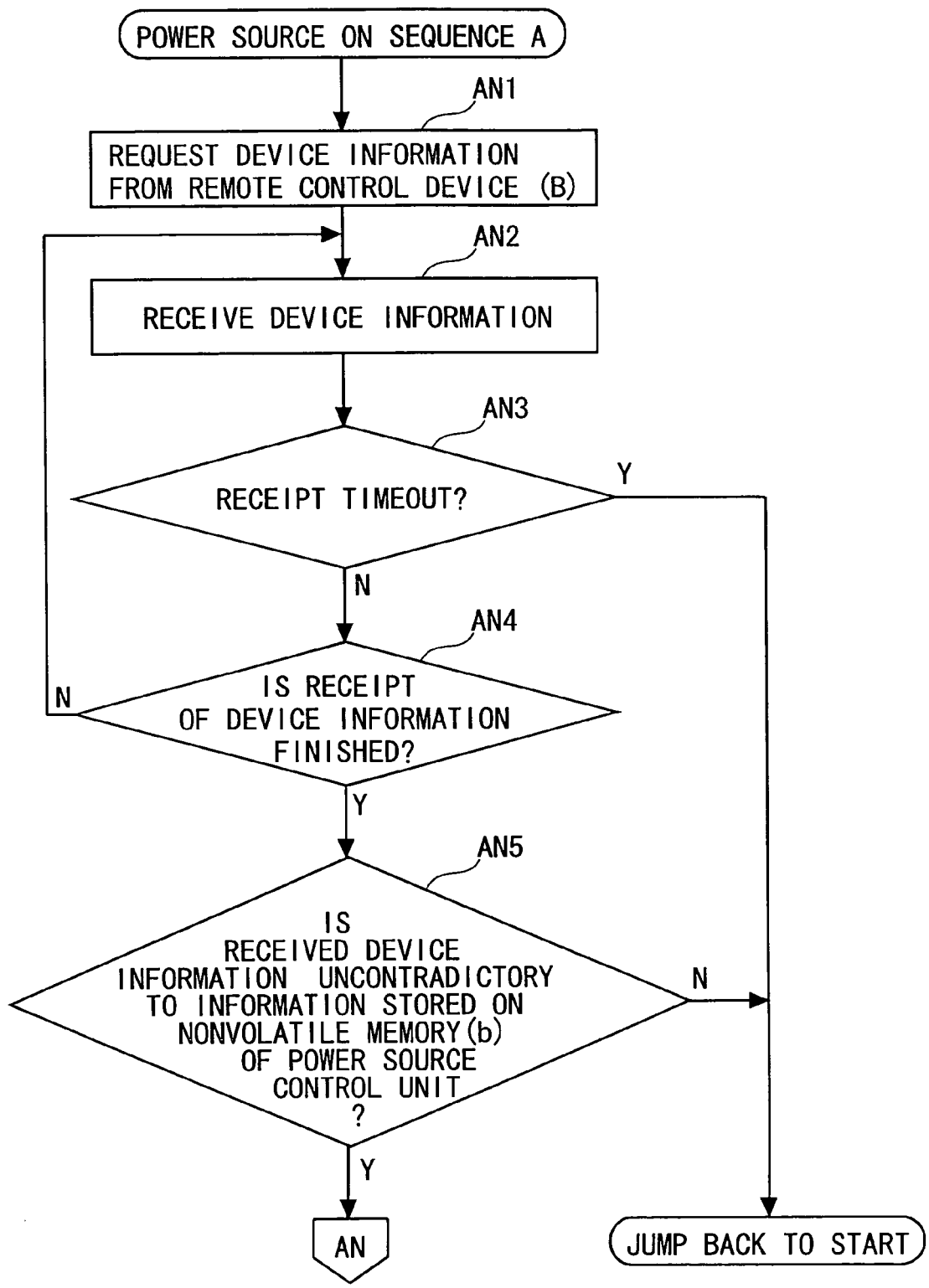
FIG. 5 is a flowchart showing an example of the operation of the power source control unit shown in FIG. 1.
Figure 6:
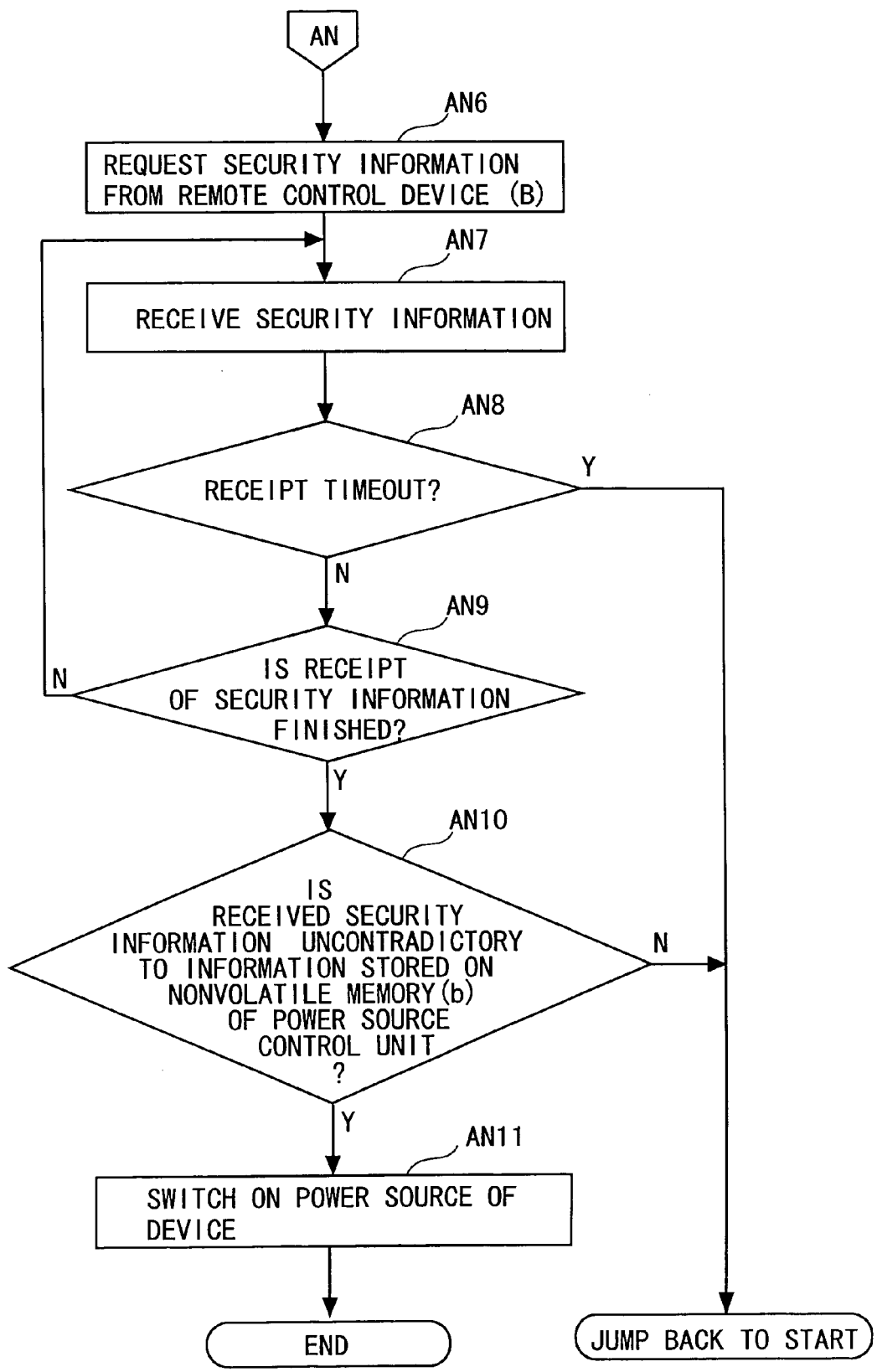
FIG. 6 is a flowchart showing an example of the operation of the power source control unit shown in FIG. 1.

To begin with, an example of an operation of the power source control device 100 will be explained with reference to FIGS. 4 through 8. As shown in FIG. 4, in such cases that the transmitting/receiving unit 102 receives the data from the power source ON/OFF remote control device 200 (AM1), that the receipt data received by the transmitting/receiving unit 102 is a piece of information showing that the ON command input unit 202 (a power source ON button) is pressed (AM2), and that the supply unit 101 does not supply any electric power (the power sources is set OFF) (AM3), the operation proceeds to a power source ON sequence A shown in FIGS. 5 and 6 (AM4).

The control unit 105 requests the device information from the power source ON/OFF remote control device 200 (AN1), and the transmitting/receiving unit 102 receives the device information (AN2). At this time, if a fixed period of time elapses before receiving the device information, the timer unit judges that it is a timeout, and the operation returns to START shown in FIG. 4 (AN3). When the transmitting/receiving unit 102 finishes receiving the device information (AN4), the information judging unit 104 judges whether or not the received device information is contradictory to the device information stored on the storage unit 103 (AN5). In a case where the information judging unit 104 judges that there is no contraction, the control unit 105 requests the security information from the power source ON/OFF remote control device 200 (AN6), and the transmitting/receiving unit 102 receives the security information (AN7). When the transmitting/receiving unit 102 finishes receiving the security information without a receipt timeout (AN8, AN9), the information judging unit 104 judges whether or not the received security information is contradictory to the security information stored on the storage unit 103 (AN10). The information judging unit 104, in the case of judging that there is no contraction, sends a power supply request to the supply unit 101, and the supply unit 101 supplies the device D with the electric power (AN11).

In a case where the system according to this embodiment is in an initial state, however, the storage unit 205 of the power source ON/OFF remote control device 200 is stored with none of the device information. It is therefore impossible to execute the receipt of the device information by the transmitting/receiving unit 102 at a point of time of AN2 shown in FIG. 5 and a check of the security information by the information judging unit 104 at a point of time of AN10 shown in FIG. 6. At this time, the information judging unit 104 sends the power supply request to the supply unit 101 without checking the security information, and the supply unit 101 supplies the electric power to the device D. It is possible to attain actualization thereof by such an architecture that, for example, in the initial state, the storage unit 205 of the power source ON/OFF remote control device 200 retains the device information indicating the initial state, and the information judging unit 104 judges that the initial state is at the point of time of AN5.

Figure 7:
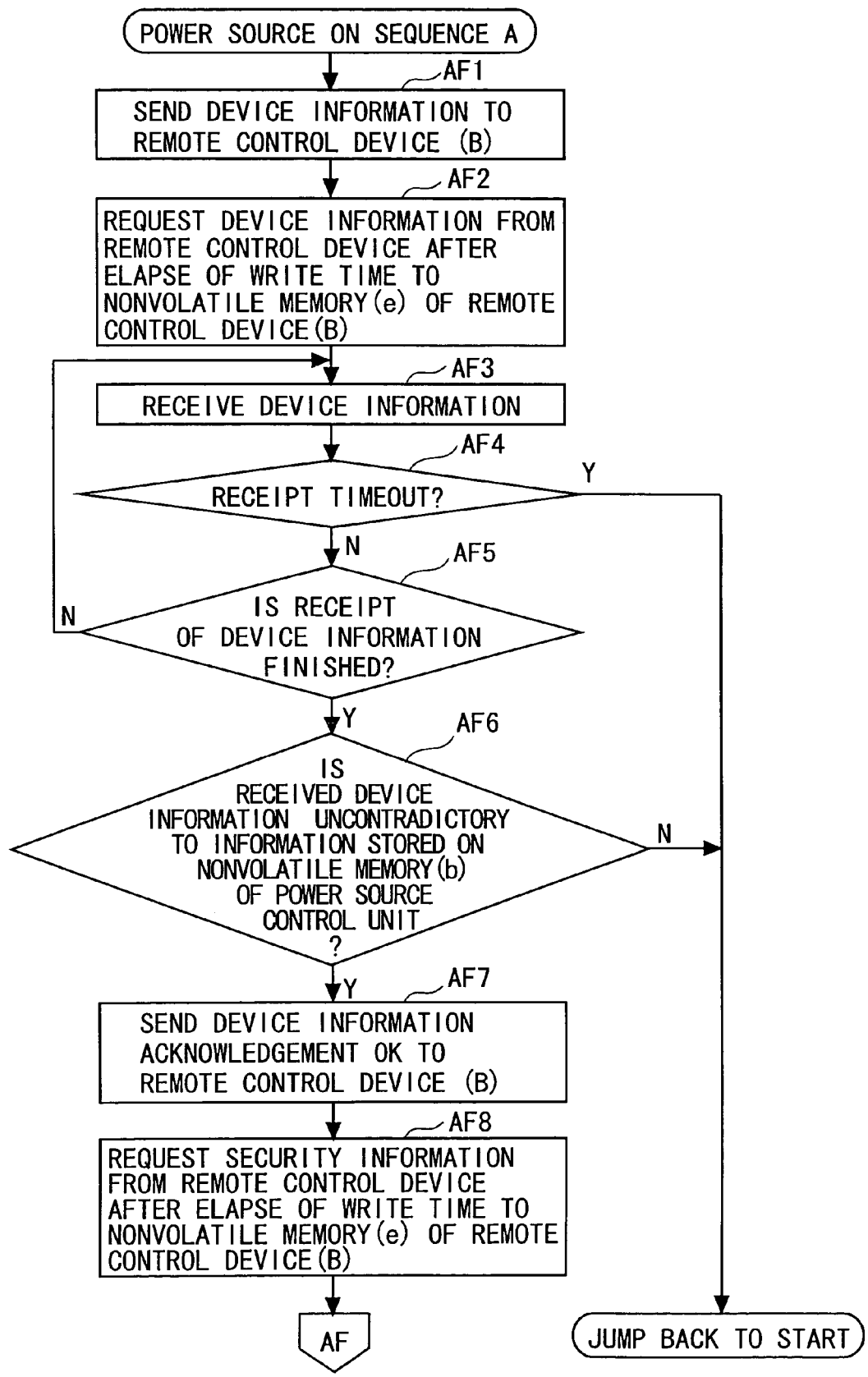
FIG. 7 is a flowchart showing an example of the operation of the power source control unit shown in FIG. 1.
Figure 8:
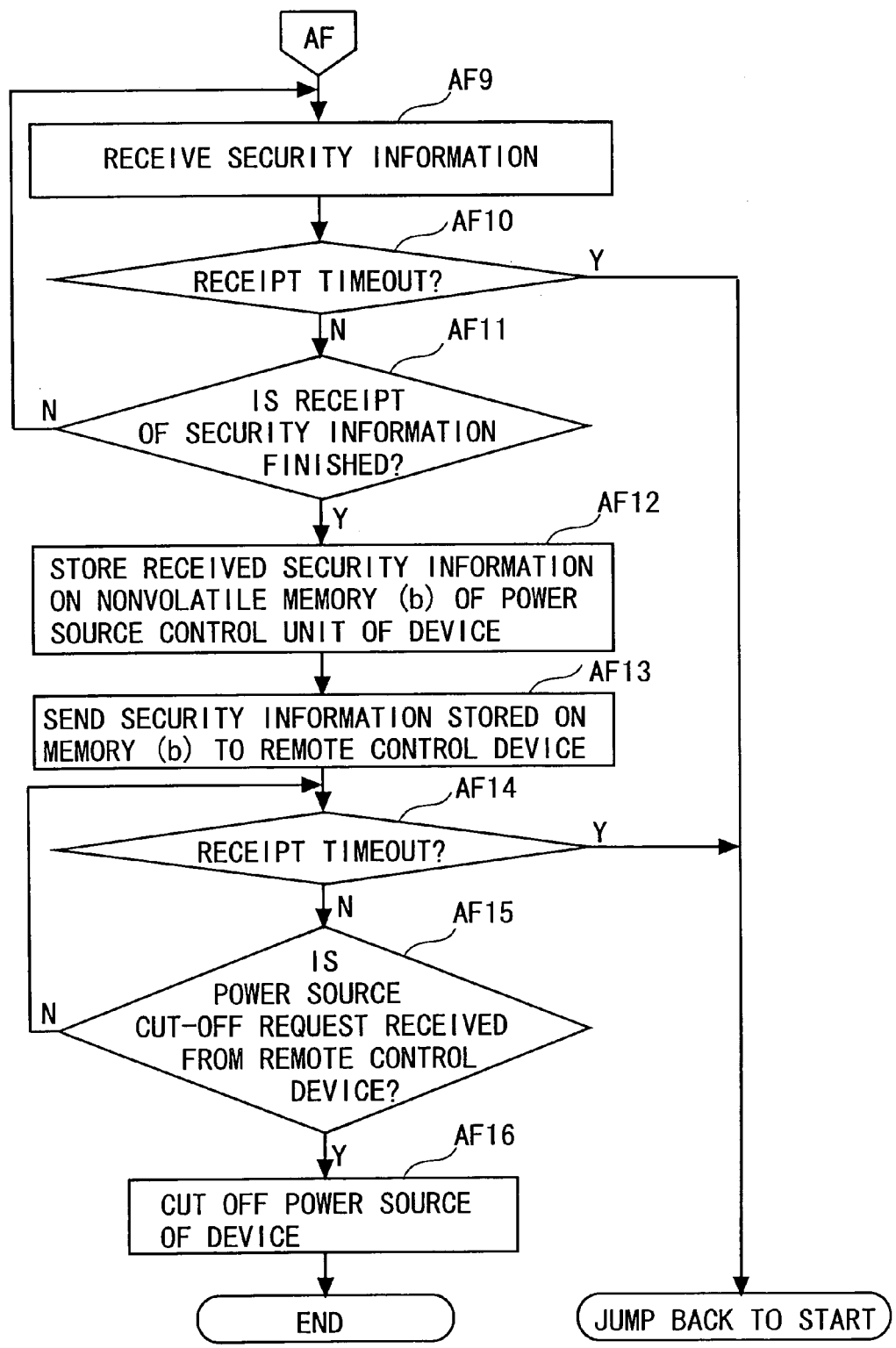
FIG. 8 is a flowchart showing an example of the operation of the power source control unit shown in FIG. 1.

In such cases that the transmitting/receiving unit 102 receives the data from the power source ON/OFF remote control device 200 (AM1), that the received data is not a piece of information showing that the ON command input unit 202 is pressed (AM2) but a piece of information showing that the OFF command input unit 203 is pressed (AM5), and that the power source of the device is ON (AM6), the operation proceeds to a power source OFF sequence A shown in FIGS. 7 and 8 (AM7).

To start with, the transmitting/receiving unit 102 transmits the device information to the power source ON/OFF remote control device 200 (AF1). After the timer unit has judged that a write time to the storage unit 205 of the power source ON/OFF remote control device 200 has elapsed, the control unit 105 requests the device information from the power source ON/OFF remote control device 200 (AF2), and the transmitting/receiving unit 102 receives the device information (AF3) When the transmitting/receiving unit 102 finishes receiving the device information without a receipt timeout (AF4, AF5), the information judging unit 104 judges whether or not the received device information is contradictory to the device information stored on the storage unit 103 (AF6) In a case where the information judging unit 104 judges that there is no contraction, the transmitting/receiving unit 102 notifies the power source ON/OFF remote control device 200 that those pieces of device information are not contradictory (AF7). Next, the control unit 105 requests the security information from the power source ON/OFF remote control device 200 (AF8), the transmitting/receiving unit 102 receives the security information (AF9) Upon an end of receiving the security information without a receipt timeout (AF10, AF11), the control unit 105 writes the received security information to the storage unit 103 (AF12), and the transmitting/receiving unit 102 transmits the written security information to the power source ON/OFF remote control device 200 (AF13). In a case where the transmitting/receiving unit 102 receives a power cut-off request from the power source ON/OFF remote control device 200 without a receipt timeout (AF14, AF15), the stopping unit 106 cuts off the power source of the device (device) (AF16).

<<Power Source ON/OFF Remote Control Device 200>>

Next, an example of an operation of the power source ON/OFF remote control device 200 will be explained with reference to FIGS. 9 through 12.

Figure 9:
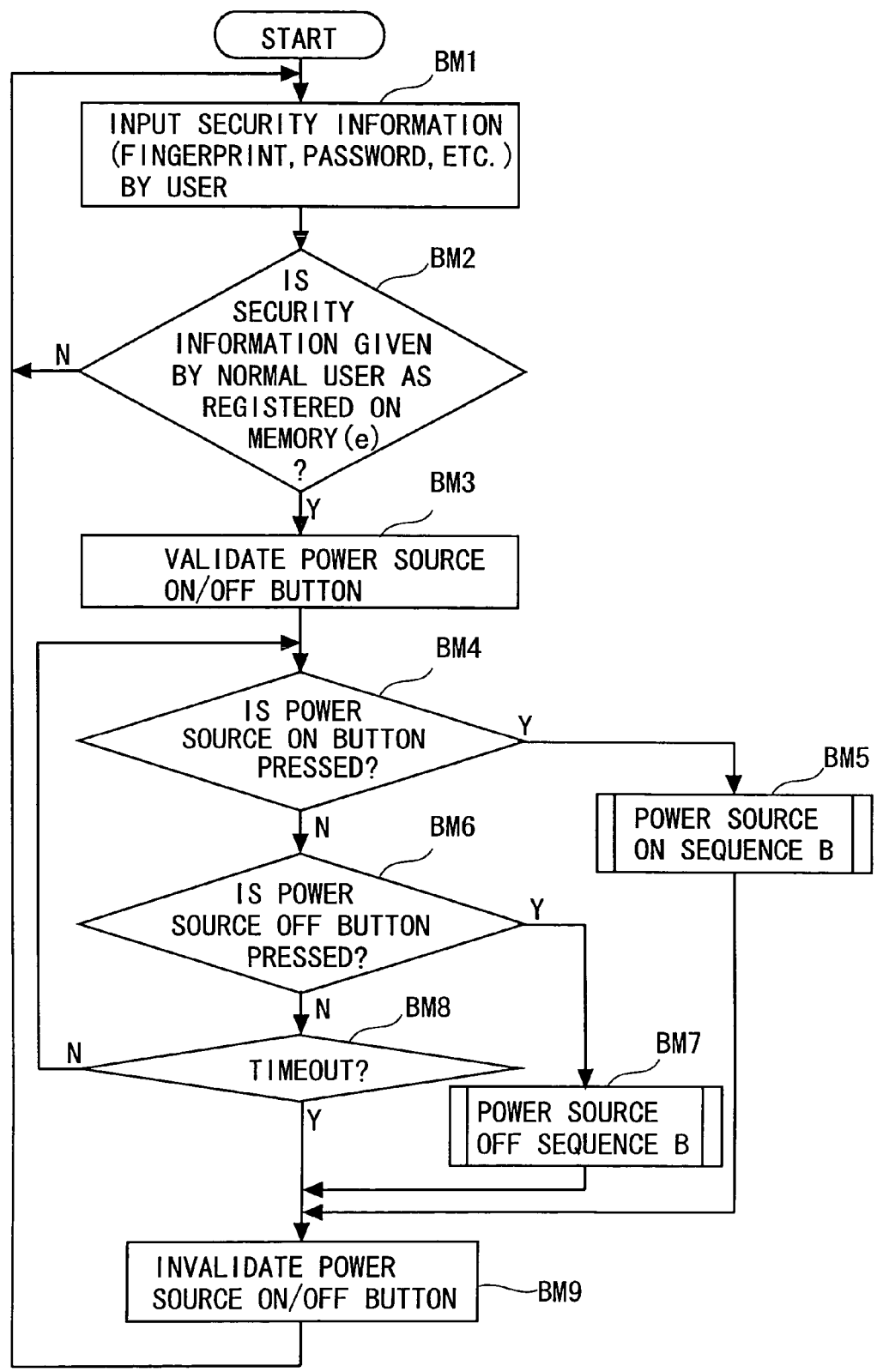
FIG. 9 is a flowchart showing an example of an operation of a power source ON/OFF remote control device shown in FIG. 1.
Figure 10:
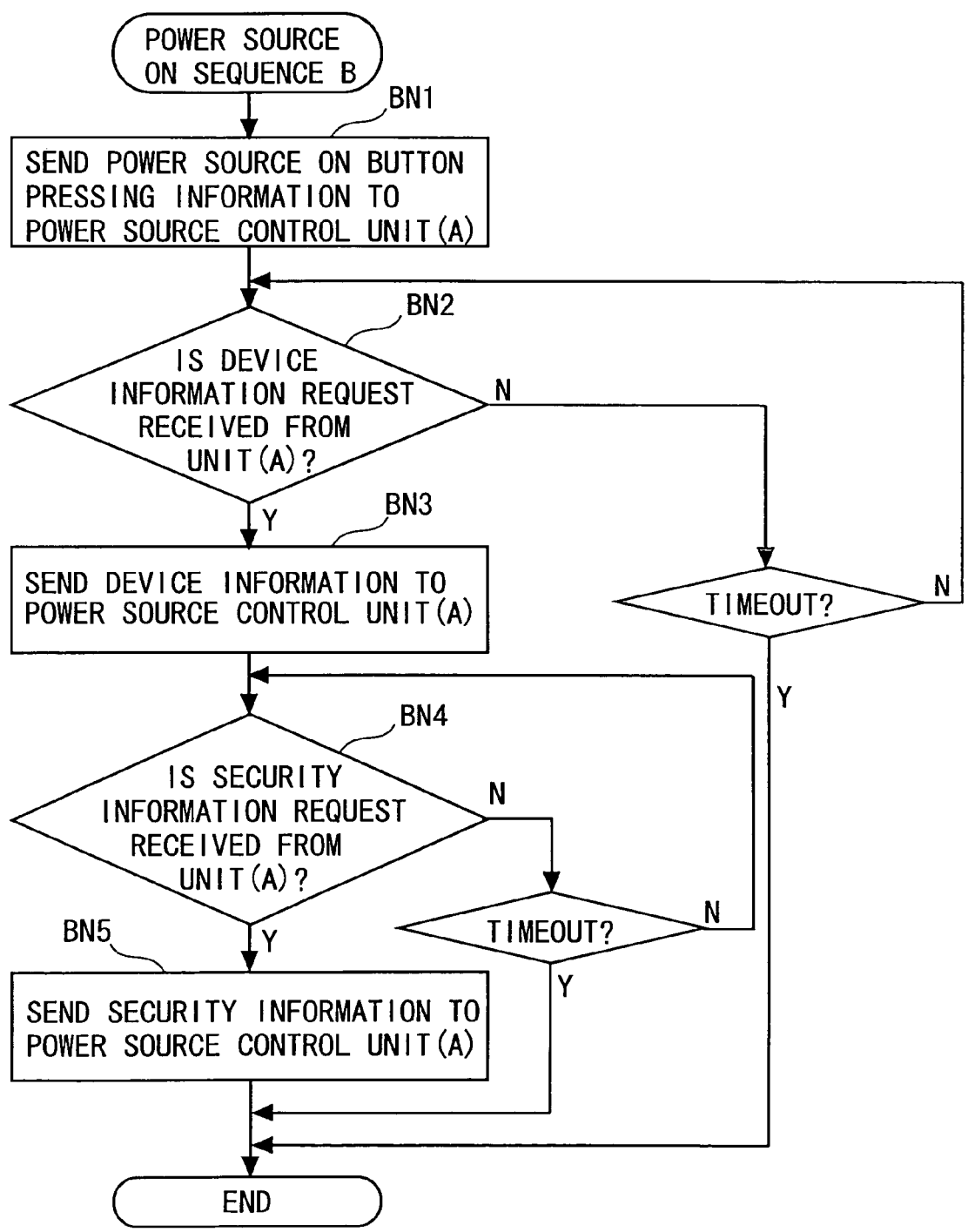
FIG. 10 is a flowchart showing an example of the operation of the power source ON/OFF remote control device shown in FIG. 1.

As shown in FIG. 9, when the user inputs the security information from on the security information input unit 201 (BM1) the information judging unit 206 judges whether or not the inputted security information is contradictory to the security information stored on the storage unit 205 (BM2). In the case of judging that there is no contradiction (in the case of judging that the user is a normal user), the canceling unit 209 cancels regulations effected by the regulation unit 208 upon the ON command input unit 202 and the OFF command input unit 203 (BM3) Here at, when the ON command input unit 202 is pressed (BM4), the operation proceeds to a power source ON sequence B shown in FIG. 10 (BM5).

The transmitting/receiving unit 204, after sending to the power source control device 100 a piece of information purporting that the ON command input unit 202 has been pressed (BN1), receives a device information request from the power source control device 100 (BN2) and transmits the device information to the power source control device 100 (BN3). Thereafter, the transmitting/receiving unit 204 receives a security information request from the power source control device 100 (BN4) and transmits the security information to the power source control device 100 (BN5). Thereafter, as shown in FIG. 9, the regulation unit 209 regulates again the operations of the ON command input unit 202 and of the OFF command input unit 203 (BM9).

Figure 11:
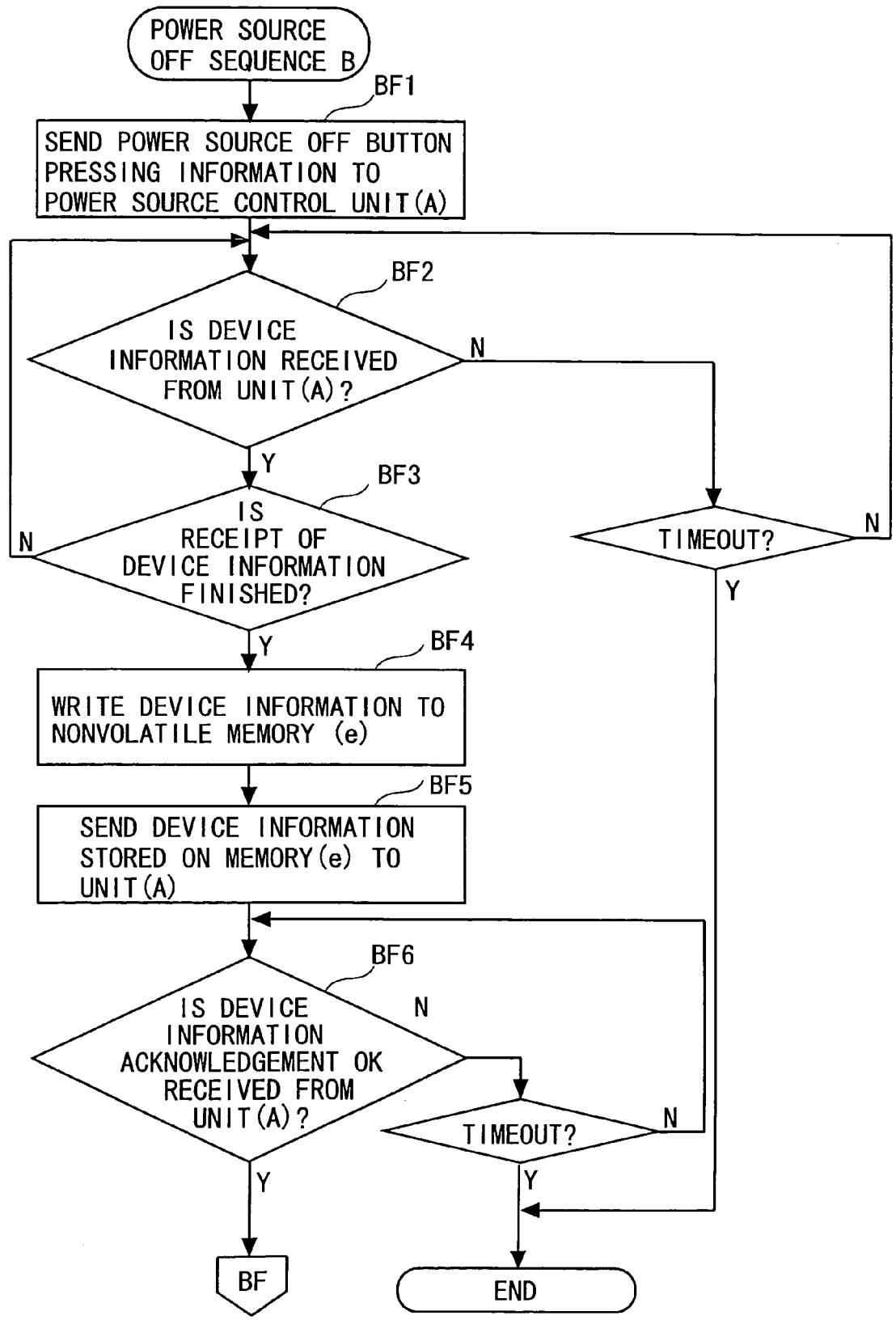
FIG. 11 is a flowchart showing an example of the operation of the power source ON/OFF remote control device shown in FIG. 1.
Figure 12:
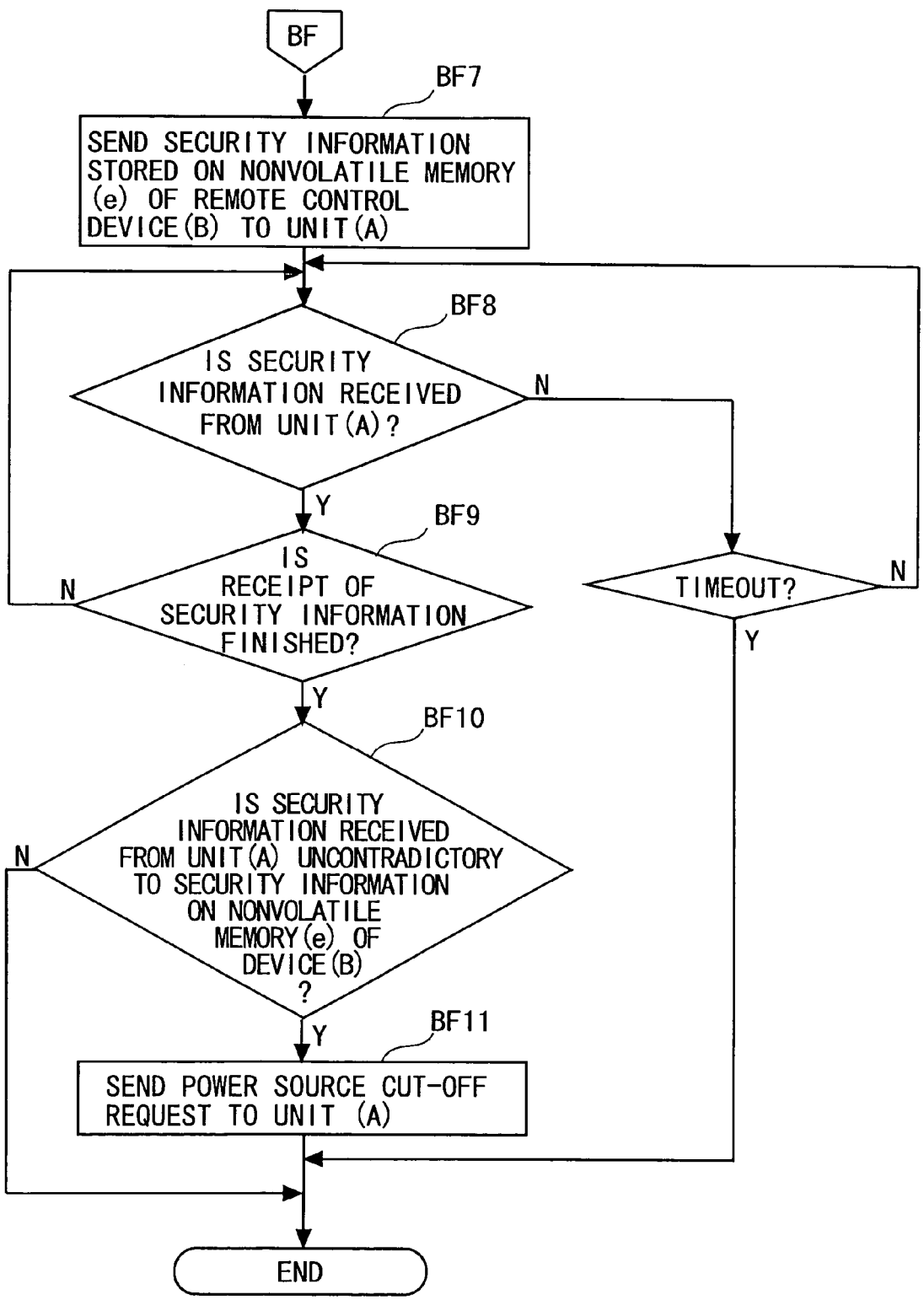
FIG. 12 is a flowchart showing an example of the operation of the power source ON/OFF remote control device shown in FIG. 1.

If the OFF command input unit 203 is pressed (BM4, BM6) after the canceling unit 208 has canceled the regulations effected by the regulation unit 209 upon the ON command input unit 202 and the OFF command input unit 203 (BM3), the operation proceeds to a power source OFF sequence B shown in FIGS. 11 and 12 (BM7).

The transmitting/receiving unit 204, after sending to the power source control device 100 apiece of information purporting that the OFF command input unit 203 has been pressed (BF1), receives the device information from the power source control device 100 (BF2). When the transmitting/receiving unit 204 finishes receiving the device information (BF3), the control unit 207 writes the device information to the storage unit 205 (BF4), and the transmitting/receiving unit 204 sends the written device information to the power source control device 100 (BF5) When the transmitting/receiving unit 204 receives a device information acknowledgement from the power source control device 100 (BF6), the transmitting/receiving unit 204 transmits the security information stored on the storage unit 205 to the power source control device 100 (BF7). Thereafter, the transmitting/receiving unit 204 receives the security information from the power source control device 100 (BF8), the information judging unit 206 judges, after finishing the receipt (BF9), whether or not the security information, of which the receipt has been finished, is contradictory to the security information stored on the storage unit 205 (BF10). In a case where the information judging unit 206 judges that there is no contradiction, the transmitting/receiving unit 204 sends a stop command (a power source cut-off request) to the power source control device 100. Thereafter, as shown in FIG. 9, the regulation unit 208 regulates again the operations of the ON command input unit 202 and the OFF command input unit 203.

<Data Flow>

FIGS. 13 and 14 are diagrams showing examples of how the power source control device 100 and the power source ON/OFF remote control device 200 transfer and receive the information. A flow of data transfer/receipt conducted between the power source control device 100 and the power source ON/OFF remote control device 200, will hereinafter be explained with reference to FIGS. 13 and 14.

<<Power Source ON>>

A data flow in the case of switching ON the power source will be described referring to FIG. 13. A process of the power source ON of the device starts with the user's pressing a power source ON button on the power source ON/OFF remote control device 200. When the device power source control unit (the power source control unit 100) receives a power source ON button pressing information from the power source ON/OFF remote control device 200, the power source control unit 100 issues, to the power source ON/OFF remote control device 200, a command requesting the device information stored on the nonvolatile memory within the power source ON/OFF remote control device 200 (ON1).

The power source ON/OFF remote control device 200, when receiving the command requesting the device information, transfers the device information to the power source control unit 100 (ON2).

The power source control unit 100, when receiving the device information from the power source ON/OFF remote control device 200, compares this piece of received device information with the device information stored on the nonvolatile memory in the power source control unit 100 itself. If coincident with each other, the power source control unit 100 requests the security information from the power source ON/OFF remote control device 200. Further, if not coincident, the power source control unit 100 interrupts the power source ON process of the device, and enters a status of waiting for a piece of power source ON button pressing information given from the power source ON/OFF remote control device 200 (ON3).

The power source ON/OFF remote control device 200, upon receiving a request command for the security information from the power source control unit 100, transfers the security information stored on the nonvolatile memory of the power source ON/OFF remote control device 200 itself to the power source control unit 100 (ON4).

The power source control unit 100, when receiving the security information from the power source ON/OFF remote control device 200, compares this piece of security information with the security information stored on the nonvolatile memory. If coincident with each other, the power source control unit 100 inputs the power source of the device (ON5).

<<Power Source OFF>>

A data flow in the case of switching OFF the power source will be explained with reference to FIG. 14. A power source OFF process of the device starts with the user's pressing a power source OFF button on the power source ON/OFF remote control device 200. When the device power source control unit receives a power source OFF button pressing information from the power source ON/OFF remote control device 200, the power source control unit 100 transmits, to the power source ON/OFF remote control device 200, the device information stored on the nonvolatile memory in power source control unit 100 (OFF1).

The power source ON/OFF remote control device 200, when receiving the command requesting the device information, transfers the device information to the power source control unit 100 (ON2).

The power source ON/OFF remote control device 200 having received the device information writes the received device information to the nonvolatile memory of the power source ON/OFF remote control device 200 itself. The power source ON/OFF remote control device 200 reads the device information written to the nonvolatile memory of the power source ON/OFF remote control device 200 itself, and transmits the readout data to the power source control unit 100 (OFF2).

The power source control unit 100 compares the device information received from the power source ON/OFF remote control device 200 with the device information stored on its own nonvolatile memory. If these pieces of information are coincident with each other, the power source control unit 100 sends device information acknowledgement OK data to the power source ON/OFF remote control device 200. If not coincident, the power source control unit 100 returns to a status of waiting for the power OFF button to be pressed without executing the power OFF process of the device any farther (OFF3).

The power source ON/OFF remote control device 200, when receiving the device information acknowledgement OK data from the power source control unit 100, transmits the security information stored beforehand on the nonvolatile memory of the power source ON/OFF remote control device 200 itself to the power source control unit 100 (OFF4).

The power source control unit 100 stores the nonvolatile memory of the power source control unit 100 itself with the security information received from the power source ON/OFF remote control device 200. The power source control unit 100 reads the security information stored on the nonvolatile memory of the power source control unit 100 itself, and sends the readout data back to the power source ON/OFF remote control device 200 (OFF5).

The power source ON/OFF remote control device 200 compares the security information received from the power source control unit 100 with the security information stored on the nonvolatile memory of the power source ON/OFF remote control device 200 itself. If these pieces of information are coincident with each other, the power source ON/OFF remote control device 200 transmits device power source cut-off instruction data to the power source control unit 100. If not coincident, the power source ON/OFF remote control device 200 returns to a status of waiting for the power source OFF button to be pressed without executing the power source OFF process of the device any farther. (OFF6)

The power source control unit 100, upon receiving the device power source cut-off instruction data from the power source ON/OFF remote control device 200, cuts off the power source of the device. (OFF7)

According to the present invention, the power source of the electronic device is controlled by use of the power source control device and the power source remote control device, thereby making it difficult for a party other than the persons concerned to set a standby status by supplying the electric power to the electronic device.

What is claimed is:

1. A power source control device for an electronic device, comprising:

a storage unit storing condition information about conditions for supplying electric power to the electronic device;

a receiving unit receiving, via a communication path from a power source remote control device of said electronic device, condition judging information for judging whether the conditions are met or not and a power supply command to said electronic device, the power source remote control device having a transmitting and receiving function to the power source control device;

a judging unit judging whether the conditions are met or not by use of the condition judging information received by said receiving unit and the condition information stored on the storage unit;

a supply unit controlling, in a case where said judging unit judges that the conditions are met, a power source of said electronic device so that said electronic device is supplied with the electric power;

a notifying unit notifying, in a case where said receiving unit receives a stop command of a supply of the electric power to said electronic device from said power source remote control device, said power source remote control device of the condition judging information associated with the condition information stored on said storage unit;

a check-and-judge unit judging, in a case where said receiving unit receives from said power source remote control device the condition judging information which said notifying unit has notified of, whether the conditions are met or not by use of the condition judging information and the condition information stored on said storage unit; and a stopping unit controlling, in a case where said check-and-judge unit judges that the conditions are met, the power source of said electronic device so as to stop the supply of the electric power to said electronic device.

2. A power source control device for an electronic device according to claim 1, wherein said storage unit stores collation source information as the condition information, said receiving unit receives collation object information as the condition judging information from said power source remote control device, and said judging unit, in a case where the collation source information is coincident with the collation object information, judges that the conditions are met.

3. A power source control device for an electronic device according to claim 2, wherein the collation source information contains identifying information of said electronic device.

4. A power source control device for an electronic device according to claim 3, wherein the identifying information of said electronic device contains an end time of said electronic device.

5. A power source control device for an electronic device according to claim 2, wherein the collation source information contains authenticating information of a user of said electronic device.

6. A power source control device for an electronic device according to claim 5, wherein the authenticating information of the user contains a password designated by the user.

7. A power source control device for an electronic device according to claim 5, wherein the authenticating information of the user contains biometrics information of the user.

8. A power source control device for an electronic device according to claim 2, wherein the collation source information contains electronic device identifying information generated by said electronic device or by said power source control device and of which said power source remote control device is notified as the collation object information, and contains user authenticating information received from said power source remote control device and used also as the collation object information.

9. A power source control system for an electronic device, comprising:
a power source control device including:
a condition information storage unit storing condition information about conditions for supplying electric power to an electronic device;
a receiving unit receiving, in the case of obtaining a power supply command to said electronic device, condition judging information for judging whether the conditions are met or not via a communication path from a power source remote control device of said electronic device, the power source remote control device having a transmitting and receiving function to the power source control device; a judging unit judging whether the conditions are met or not by use of the condition judging information received by said receiving unit and the condition information stored on the condition information storage unit; and
a supply unit giving, in a case where said judging unit judges that the conditions are met, an instruction of supplying the electric power to said electronic device;
the power source remote control device including:
a condition judging information storage unit storing the condition judging information; an input unit; and a transmitting unit transmitting, in a case where a power supply command to said electronic device is inputted from said input unit, the power supply command and the condition judging information stored on said condition judging information storage unit to said power source control device via the communication path;
the power source control device further including
a notifying unit notifying, in a case where said receiving unit receives a stop command of a supply of the electric power to said electronic device from said power source remote control device, said power source remote control device of the condition judging information associated with the condition information stored on said condition information storage unit; a check-and-judge unit judging, in a case where said receiving unit received from said power source remote control device the condition judging information which said notifying unit has notified of, whether the conditions are met or not by use of the condition judging information and the condition information stored on said condition information storage unit; and a stopping unit stopping, in a case where said check-and-judge unit judges that the conditions are met, the supply of the electric power to said electronic device, and
wherein said power source remote control device, in the case of receiving the condition judging information from said notifying unit, stores said condition judging information storage unit with the condition judging information, and transmits the condition judging information to said power source control device for processing by said check-and-judge unit.

10. A power source control system for an electronic device according to claim 9, wherein said condition information storage unit stores collation source information as the condition information,
said receiving unit receives collation object information as the condition judging information from said power source remote control device, and
said judging unit, in a case where the collation source information is coincident with the collation object information, judges that the conditions are met.

11. A power source control system for an electronic device according to claim 10, wherein the collation source information contains identifying information of said electronic device.

12. A power source control system for an electronic device according to claim 11, wherein the identifying information of said electronic device contains an end time of said electronic device.

13. A power source control system for an electronic device according to claim 11, wherein the collation source information contains authenticating information of a user of said electronic device.

14. A power source control system for an electronic device according to claim 13, wherein the authenticating information of the user contains a password designated by the user.

15. A power source control system for an electronic device according to claim 13, wherein the authenticating information of the user contains biometrics information of the user.

16. A power source control system for an electronic device according to claim 10, wherein the collation source information contains electronic device identifying information generated by said electronic device or by said power source control device and given as the collation object information to said power source remote control device, and contains user authenticating information received from said power source remote control device and used also as the collation object information.

17. A power source control system for an electronic device according to claim 9 wherein said power source remote control device further includes: a regulation unit regulating an operation of transmitting the power supply command to the said power source control device by said transmitting unit and/or an operation of inputting the power supply command and a stop command by said input unit; a cancellation condition information storage unit stored with cancellation condition information about conditions for canceling the regulation; a cancellation condition judging unit judging, in a case where there is inputted cancellation condition judging information for judging whether the cancellation conditions are met or not, whether the cancellation conditions are met or not by use of the cancellation condition information stored on said cancellation condition information storage unit and the inputted cancellation condition judging information; and a canceling unit canceling the regulation in a case where said cancellation condition judging unit judges that the cancellation conditions are met.

18. A power source control system for an electronic device according to claim 9, wherein said power source remote control device has a portable box body provided with said condition judging information storage unit, said input unit and said transmitting unit, and said transmitting unit transmits the power supply command and the condition judging information to said power source control device in a non-contact communication.

19. A power source control method for an electronic device, comprising:

receiving, via a communication path from a power source remote control device of said electronic device, condition judging information for judging whether conditions for supplying electric power to said electronic device are met or not and a power supply command to said electronic device, the power source remote control device having a transmitting and receiving function to a power source control device;

judging whether the conditions are met or not by use of the received condition judging information and condition information about the conditions;

controlling, in a case where judging that the conditions are met, a power source of said electronic device so that said electronic device is supplied with the electric power;

notifying, in a case where said receiving receives a stop command of a supply of the electric power to said electronic device from said power source remote control device, said power source remote control device of the condition judging information associated with the condition information stored on said storage unit;

judging, in a case where said receiving receives from said power source remote control device the condition judging information which said notifying unit has notified of, whether the conditions are met or not by use of the condition judging information and the condition information stored on said storage unit; and controlling, in a case where said judging judges that the conditions are met, the power source of said electronic device so as to stop the supply of the electric power to said electronic device.

20. A computer readable recording medium encoding a power source control program for controlling an electronic device, comprising:

receiving, via a communication path from a power source remote control device of said electronic device, condition judging information for judging whether conditions for supplying electric power to said electronic device are met or not and a power supply command to said electronic device, the power source remote control device having a transmitting and receiving function to a power source control device;

judging whether the conditions are met or not by use of the received condition judging information and condition information about the conditions;

controlling, in a case where judging that the conditions are met, a power source of said electronic device so that said electronic device is supplied with the electric power unit notifying, in a case where said receiving receives a stop command of a supply of the electric power to said electronic device from said power source remote control device, said power source remote control device of the condition judging information associated with the condition information stored on said storage unit;

judging, in a case where said receiving receives from said power source remote control device the condition judging information which said notifying unit has notified of, whether the conditions are met or not by use of the condition judging information and the condition information stored on said storage unit; and controlling, in a case where said judging judges that the conditions are met, the power source of said electronic device so as to stop the supply of the electric power to said electronic device.

* * * * *